(No Model.) 2 Sheets—Sheet 1.
J. J. DE KINDER.
CAR FENDER.
No. 532,566. Patented Jan. 15, 1895.
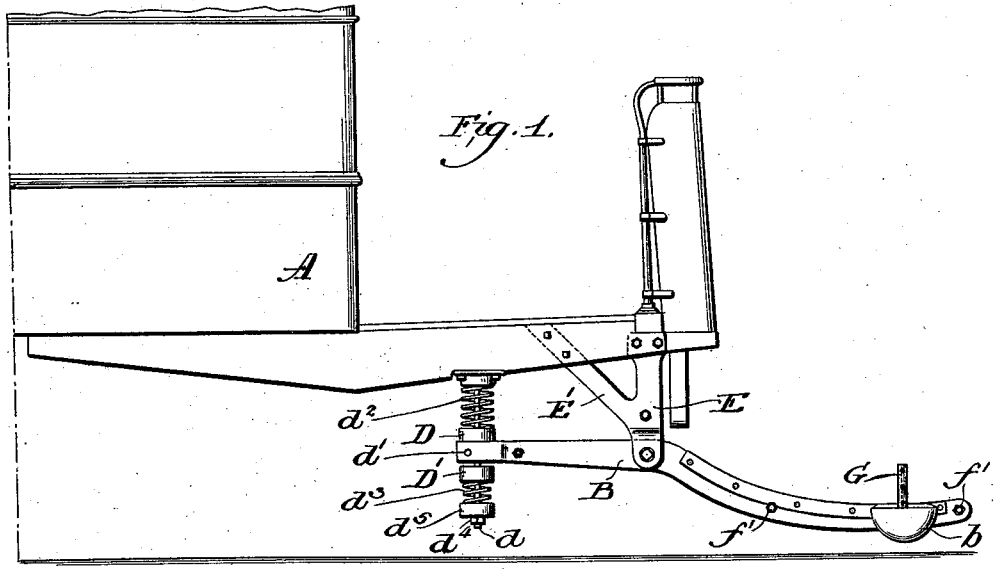
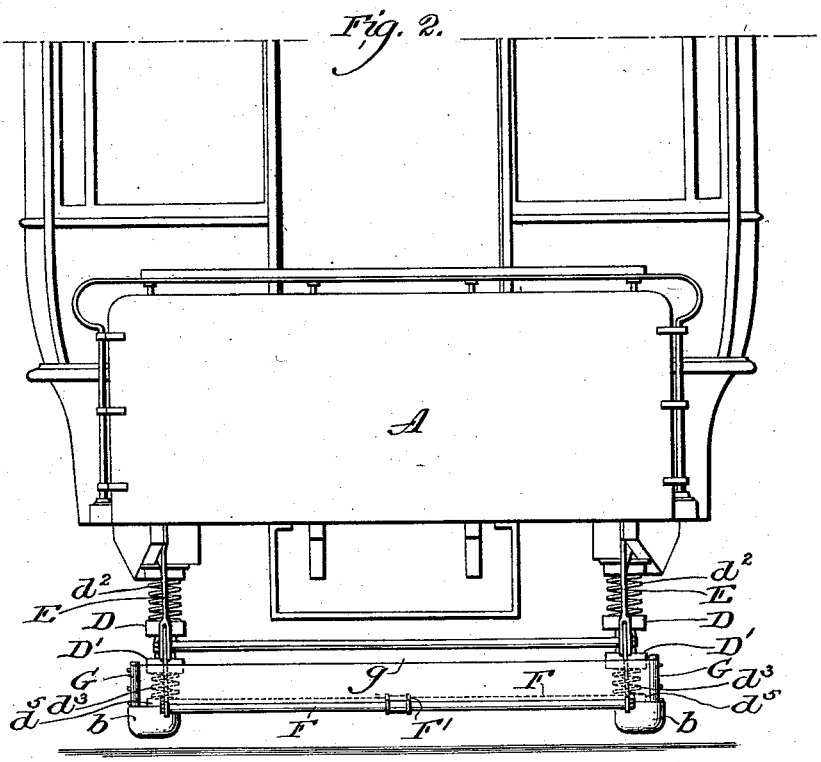
WITNESSES:
INVENTOR:

(No Model.) 2 Sheets—Sheet 2.
J. J. DE KINDER.
CAR FENDER.
No. 532,566. Patented Jan. 15, 1895.
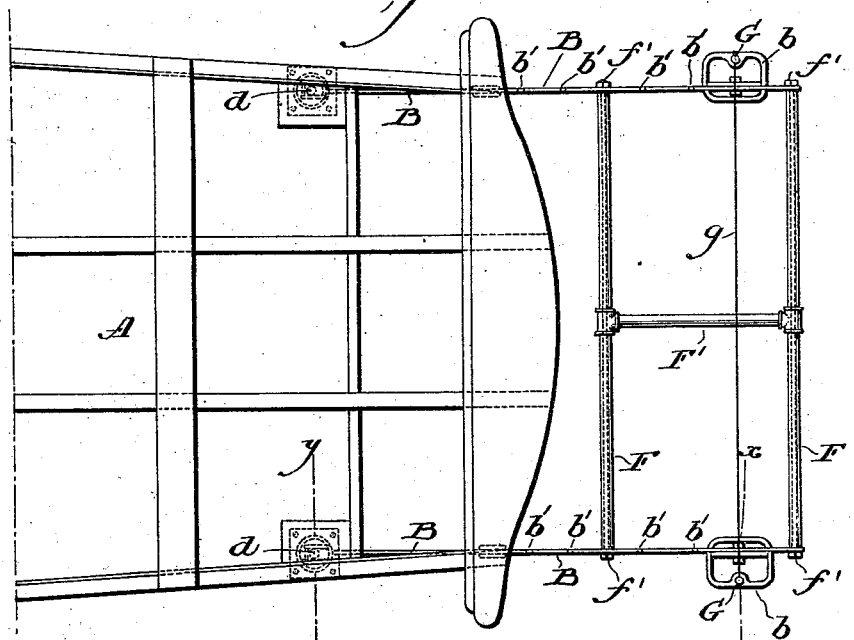
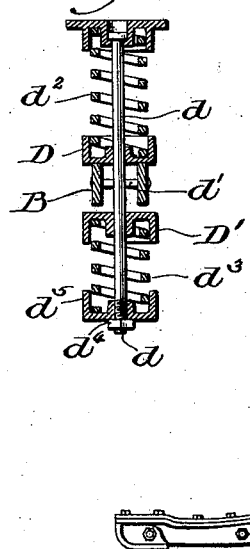
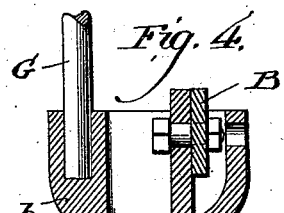
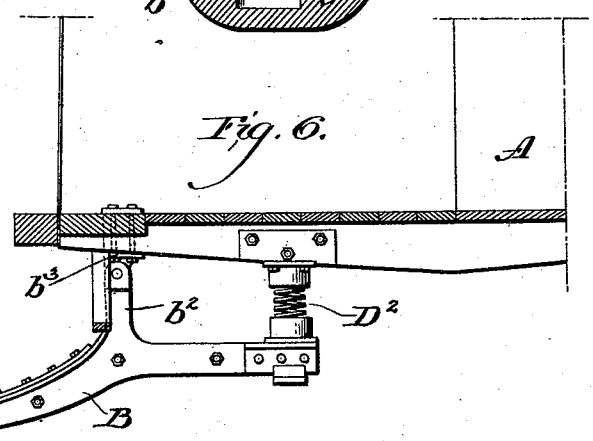
WITNESSES: INVENTOR:

UNITED STATES PATENT OFFICE.

JOSEPH J. DE KINDER, OF PHILADELPHIA, PENNSYLVANIA.

CAR-FENDER.

SPECIFICATION forming part of Letters Patent No. 532,566, dated January 15, 1895.

Application filed November 27, 1893. Serial No. 492,031. (No model.)

*To all whom it may concern:*

Be it known that I, JOSEPH J. DE KINDER, a citizen of the United States, residing at Philadelphia, county of Philadelphia, and State of Pennsylvania, have invented a new and useful Improvement in Safety-Fenders for Railroad-Cars, of which the following is a full, clear, and exact description, reference being had to the accompanying drawings, which form a part of this specification.

My invention belongs to that class of mechanism which has for its object to prevent the car from passing over persons who come in the path of the car, and who are unable to remove themselves from the path of said car from lack of time and who would otherwise be struck by the car and the car pass over them; and my invention consists in certain improved constructions and attachment to the car to attain this end with certainty and in a proper manner.

I will first describe my invention and then particularly point out my improvement in the claims.

In the drawings:—Figure 1 is a side elevation of a portion of a car equipped with a fender constructed and attached to the car according to my invention. Fig. 2 is a rear view of the same. Fig. 3 is a plan view. Fig. 4 is a section at $x$—$x$, Fig. 3. Fig. 5 is a section at $y$—$y$, Fig. 3. Fig. 6 is a modified form of fender and attachment to car.

A is the car.

B are the fender bars, one on each side of the car, which project in front of the car and are provided with the wearing shoes, $b$, at or near their forward ends. As shown in Fig. 1, the bar is bent in its forward portion, so as to form a curved surface, and at or about the point where the bar reaches the line of car platform the curved surface ends and the bar extends backward and is provided with forked ends which rest between the disks D, D'. A rod $d$ extends through these disks and between the forks of bar B. A bolt $d'$ closes the opening of the forks when the bar is in position. This rod $d$ is firmly secured to the car platform and between the disk D and the platform is the coil spring $d^2$, and between the disk D' and the lower end of rod $d$ is the coil spring $d^3$ and a nut $d^4$ and washer $d^5$ secure the lever end of coil spring $d^3$. The forward end of the straight portion of bar B is pivotally secured to the arm E, which arm is secured to the platform and has the brace arm E' also secured to the car. The pivotal point of bar B is at substantially the same level as the point of suspension of forked end of said bar.

The two bars B are connected together at the forward and intermediate point preferably by pipes F, as shown in Fig. 2, and a rod passing through said pipes, and is secured by nuts, $f'$ to the bar B. A cross connection F' connects the two connections F. The curved portion of bars B are provided with orifices $b'$, and canvas provided with corresponding orifices is stretched between the bars B and secured by pins or analogous devices passing through the orifices in the canvas and the orifices in the bars. The shoe is connected to the bar in the following manner: The bar B passes through an orifice in said shoe and a bolt and nuts secure the bar and sleeve together. (See Fig. 4.) A pipe or bar G is secured in an orifice in each shoe, and canvas $g$ secured to said pipes extends from one side to the other of the fender, and forms a guard to prevent the falling off of any body deposited upon the main canvas connecting bars B.

In Fig. 6 I have shown a modification in which the bar B, in place of being pivoted in line with the connection of the bifurcated end, has an upward projecting arm, $b^2$, which is pivoted to a bearing, $b^3$ secured to the platform, and in this case I use but one coil spring, as shown, $D^2$, Fig. 6.

Speaking generally, my device and its attachments, has among others the following advantages: The arm E, the rod $d$, and its appurtenances, are connected to the car and the fender proper may be readily connected and disconnected from the car by the withdrawal of two bolts on each side, one at the pivot point, the other the bolt connecting the bifurcated end of bars B.

The construction of fender enables the same to be constructed cheaply, to be readily put together, and to have the guard or canvas covering secured thereto; also the fender, on account of its connections, can give in two directions, either due to a person falling upon the canvas or the shoe striking obstructions in the road. The canvas connected with the pipe secured in the shoe prevents a body carried over it by the momentum of the vehicle slipping back from the canvas connected to the bars B.

Having now fully described my invention, what I claim, and desire to protect by Letters Patent, is—

1. In a safety fender for railroad cars, the combination of fender bars, brackets secured to the car, to which said bars are pivoted at an intermediate point, a spring seat above and a spring seat below each of said bars and secured to the car to support the rear end of said bars, and a supporting connection between said bars.

2. In a safety fender for railroad cars, the combination of fender bars, brackets secured to the car, to which said bars are pivoted at an intermediate point, a spring seat above and a spring seat below each of said bars and secured to the car to support the rear end of said bars, supporting connection between said bars, and wearing shoes secured to the forward portion of said bars.

3. In a safety fender for railroad cars, the combination of fender bars brackets secured to the car, to which said bars are pivoted at an intermediate point, and a spring seat adapted to yield, vertically in either direction secured to the car to support the rear end of said bars, a supporting connection between said bars, upright bars, as G, connected to the forward end of said bars and adapted to support a canvas or other flexible body between them.

4. In a safety fender for railroad cars, in combination, fender bars pivotally supported at an intermediate point and forked at their rear ends, a depending rod on each side of the car, a coil spring and a disk surrounding said rod, the forked end of one of said bars being adapted to partially surround said rod and engage said disk.

5. In a safety fender for railroad cars, in combination, fender bars pivotally supported at an intermediate point and forked at their rear ends, a depending rod on each side of the car, coil springs and disks surrounding said rod and between which disks the forked end of one of said bars is adapted to rest, and means to adjust one of the disks to cause said forked end to engage both of the disks.

6. In a safety fender for railroad cars, in combination, fender bars pivotally supported at an intermediate point and spring-seated at their rear ends, and a supporting connection between said bars, a shoe on each side of the car, orifices in said shoe through which the forward end of one of said bars is adapted to extend, and means substantially as described to secure the shoe to the bar.

7. In a safety device for railroad cars, in combination, fender bars pivotally supported at an intermediate point and spring-seated at their rear ends, and a supporting connection between said bars, a shoe on each side of the car, orifices in said shoe through which the forward end of one of said bars is adapted to extend, means substantially as described to secure the shoe to the bar, and upright bars, as G, secured to the shoes and adapted to support a canvas or other flexible body between them.

8. In a safety fender for railroad cars, the combination of fender bars, brackets secured to the car to which said bars are pivoted at an intermediate point, and a spring seat secured to the car to support the rear end of said bars, a supporting connection between said bars, upright bars as G, connected to the forward end of said bars and adapted to support a canvas or other flexible body between them.

In testimony of which invention I have hereunto set my hand.

JOSEPH J. DE KINDER.

Witnesses:
FRANK S. BUSSER,
JOHN T. CARR.